UNITED STATES PATENT OFFICE.

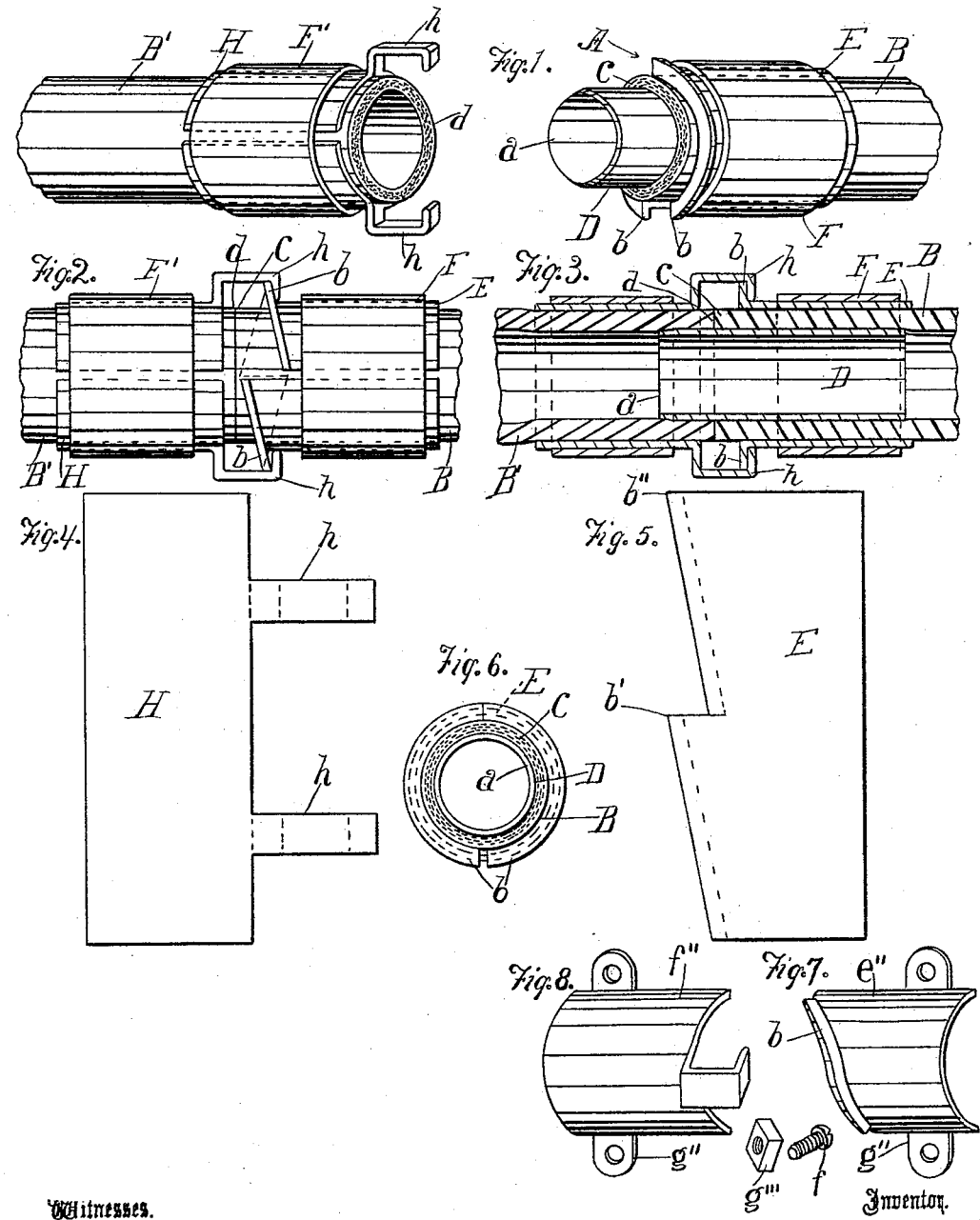

EMORY L. TOWNSEND, OF LOS ANGELES, CALIFORNIA.

MANUFACTURE OF HOSE-COUPLINGS.

SPECIFICATION forming part of Letters Patent No. 493,316, dated March 14, 1893.

Application filed April 16, 1892. Serial No. 429,438. (No model.)

*To all whom it may concern:*

Be it known that I, EMORY L. TOWNSEND, a citizen of the United States, residing at Los Angeles, in the county of Los Angeles and State of California, have invented a new and useful Improvement in the Manufacture of Hose-Couplings, of which the following is a specification.

The object of my invention is to manufacture at a minimum cost hose couplings of the class in which one member is provided with clutch arms and the other member is provided with cam flanges, also to adapt the same for more ready, convenient and complete attachment to their respective hose ends.

My coupling is especially adapted for cheap manufacture in that its main parts are of stamped bendable metal requiring no casting or finishing work to fit them for use.

The accompanying drawings illustrate my invention, showing the completed manufacture and blanks to be used in producing the same.

Figure 1 shows my hose coupling in the form which I consider the most preferable and the cheapest to manufacture, the same being arranged for the purpose of securing two hose ends together. Fig. 2 is a side view showing such hose ends secured together by the form of coupling shown in Fig. 1. Fig. 3 is a longitudinal section of Fig. 2. Fig. 4 shows a blank of bendable sheet metal cut to form the female thimble of the coupling. Fig. 5 shows a blank of bendable sheet metal cut to form the male thimble of the coupling. Fig. 6 is an end view of the male coupling thimble applied to the end of a hose. Figs. 7 and 8 illustrate parts of another form of coupling in which each male and female member is formed of two blanks provided with lugs, and which are to be fastened together by means of screws passed through such lugs.

My invention pertains to an improved method of manufacturing hose coupling thimbles whereby such thimbles are greatly reduced in cost. In manfacturing such thimbles I first provide blanks for the male and female members of such coupling; cutting the same from a flat sheet of bendable metal; the male blank having one straight side with its ends at right angles thereto and having on the other side two oblique edges or wings $b'\,b''$; the female blank being of an oblong rectangular form having on one of its long edges two oblong rectangular projections arranged so that when the blank is bent in cylindrical form they will be on opposite sides of the circumerence of the thimble, thus formed.

In the drawings A represents the complete male member after having been bent into shape to encircle the hose B.

$a$ indicates a projecting nipple which is the end of the tube D, which tube is inserted into the hose end B. The hose is clamped upon such tube by means of the male coupling thimble E and the ferrule F.

$b$ indicates the screw or cam flanges which are formed by bending the oblique wings $b'$ and $b''$ at the point indicated in dotted lines in Fig. 5.

$c$ and $d$ are the projecting ends of the hose which may be utilized to form a packing for the joint between the thimbles.

In the manufacture of my improved coupling the oblong rectangular projections $h\,h$ of the female member H (Fig. 4) are bent at the point indicated by dotted lines to form clutch arms, and the male blank sheet is bent along the oblique edges $b'\,b''$ at the point indicated by dotted lines (Fig. 5) until the oblique edge is at right angles to the axis of the cylinder of the thimble. When the male member E is bent into cylindrical form the inclines $b'\,b''$ assume a spiral or cam flange shape which the clutch arms of the female member engage when the thimbles are coupled together.

When the blanks have been cut into proper shape they may be bent by a die or other means, such as passing the blanks between rolls and then by hammering, finishing those portions which require a right angle. The whole operation of cutting and bending may be done at one stroke of a die or stamp and the whole operation completed with one handling of the piece.

The form of coupling illustrated in Figs. 1—2—3—4—5 and 6 are designed to be attached to the hose by inserting the hose into the thimble, compressing the same tightly and placing a ring or ferrule F (F') over the thimble. To complete the joint and to make it more rigid I insert the tube D into the hose which is encircled by the male member E, leaving the end to project far enough to extend into the hose end which is encircled by the female member H when the thimbles are coupled together.

The forms shown in Figs. 8 and 9 differ from the other forms in the arrangement for fastening them to the hose ends. One of the thimbles is formed of two corresponding pieces like $f''$ and the other thimble is formed of two pieces corresponding to $e''$, such pieces are provided with lugs $g''$ having holes through which bolts or screws $f$ are passed, and nuts $g'''$ are screwed on the bolts to clamp the two members together thus dispensing with the band or ferrule F (F').

I am aware that hose couplings have heretofore been made with cam flanges, and clutch arms, and I am aware that the members have been composed of two pieces held together by means of bolts passed through lugs and I do not claim any of these as my invention. Such couplings have heretofore been made of cast metal and have therefore been more expensive than my improved coupling owing to the amount of labor necessary to clean them from the molding sand and polish them ready for the market.

Now having described my invention, what I claim as new, and desire to secure by Letters Patent, is—

1. A hose coupling comprising a tubular male hose coupling thimble formed of a blank consisting of a sheet of bendable metal cut into shape with one straight side; ends at right angles therewith; and the other side having two inclined wings bent to form the cam flanges as set forth.

2. A hose coupling comprising a tubular female hose coupling thimble formed of a blank consisting of a sheet of bendable metal cut into oblong rectangular shape and provided on one edge with the two oblong rectangular projections $h\ h$ bent to form the clutch arms.

EMORY L. TOWNSEND.

Witnesses:
JAMES R. TOWNSEND,
ALFRED I. TOWNSEND.